(12) United States Patent
Corcoran

(10) Patent No.: US 6,176,232 B1
(45) Date of Patent: Jan. 23, 2001

(54) HEAT CONTROL DEVICE FOR USE WITH HINGED HOOD TOP BARBECUES

(76) Inventor: John Corcoran, P.O. Box 2712, Saratoga, CA (US) 95070

( * ) Notice: Under 35 U.S.C. 154(b), the term of this patent shall be extended for 0 days.

(21) Appl. No.: 09/398,850

(22) Filed: Sep. 17, 1999

(51) Int. Cl.⁷ ..................................................... A47J 36/00
(52) U.S. Cl. ..................................... 126/25 R; 248/354.4
(58) Field of Search .......................... 126/25 R, 25 A, 126/41 R, 9 B, 25 AA, 39 R; 292/338, 339, 288; 248/354.6, 351, 354.3, 354.4, 354.1

(56) References Cited

U.S. PATENT DOCUMENTS

| | | | |
|---|---|---|---|
| 3,418,740 | * 12/1968 | Gray | 248/354.4 |
| 3,834,745 | * 9/1974 | Coates | 126/9 B |
| 4,476,849 | * 10/1984 | Schmidt | 126/25 R |
| 4,561,417 | 12/1985 | Chen . | |
| 4,584,984 | * 4/1986 | Croft | 126/25 R |
| 4,759,338 | * 7/1988 | Croft | 126/25 R |
| 4,895,130 | * 1/1990 | Staschke | 126/25 R |
| 5,007,403 | 4/1991 | Chen . | |
| 5,016,608 | 5/1991 | Evans . | |
| 5,213,299 | * 5/1993 | Henry | 126/25 R |

* cited by examiner

*Primary Examiner*—Ira S. Lazarus
*Assistant Examiner*—Sara Clarke
(74) *Attorney, Agent, or Firm*—Goldstein & Canino

(57) ABSTRACT

A heat control device, for use with a barbecue having a hood top and a cooking base, wherein the hood top is hingeably attached to the cooking base, comprising a main body and a clamping assembly. The main body has a hood hollow for supporting the hood top and a rim hollow for engaging the cooking base and sliding longitudinally therealong. Heat flow from the barbecue is adjusted by adjusting an angle between the hood top and cooking base, and then positioning the main body upon the cooking base in a position where it will maintain said angle. The clamping assembly is then used to fix the position of the main body on the cooking base rim.

4 Claims, 2 Drawing Sheets

HEAT CONTROL DEVICE FOR USE WITH HINGED HOOD TOP BARBECUES

BACKGROUND OF THE INVENTION

The invention relates to a heat control device for use with hinged hood top barbecues. More particularly, the invention relates to a device which works in conjunction with a hinged hood top barbecue to control heat venting from the barbecue by controlling the angle of the hood top with respect to the cooking base.

Barbecuing is one of the greatest American past-times. In recent years, barbecuing has extended beyond simply cooking hot dogs and hamburgers. Now, weekend chefs attempt to cook considerably more varied and elaborate foods. However, many of these cooking tasks require greater control over the cooking temperature than a typical barbecue provides.

The standard gas grill provides the user with some control over the cooking temperature by controlling the flame intensity. However, there can be a considerable time lag after raising or lowering the flame before the grill temperature adjusts.

With charcoal grills, little can be done to control the temperature, other than to rearrange the coals. Rearranging the coals generally requires that one first remove the grill, which is not typically feasible once cooking has begun.

U.S. Pat. Nos. 4,561,417 to Chen, U.S Pat. No. 5,007,403 to Chen, and U.S. Pat. No. 5,016,608 to Evans each disclose various barbecue devices with provisions for controlling the heat and/or cooking time.

While these units may be suitable for the particular purpose employed, or for general use, they would not be as suitable for the purposes of the present invention as disclosed hereafter.

SUMMARY OF THE INVENTION

It is an object of the invention to produce a heat control device, capable of easily controlling the cooking temperature of a barbecue. Accordingly, the device operates by controlling the size of an opening between the hood top and cooking base, and thereby controlling heat flow through said opening.

It is another object of the invention to provide a heat control device which is particularly well suited for use with a hinged hood top barbecue. Accordingly, the device operates by sliding toward and away from the hinge to vary the angle between the hood top and base and thereby vary the size of the opening.

It is a further object of the invention that the heat control device is readily adaptable to be used with any existing barbecue. Accordingly, the control device easily clamps onto the rim of the cooking base of any existing barbecue and is adjustable in height and in position along the rim.

The invention is a heat control device, for use with a barbecue having a hood top and a cooking base, wherein the hood top is hingeably attached to the cooking base, comprising a main body and a clamping assembly. The main body has a hood hollow for supporting the hood top and a rim hollow for engaging the cooking base and sliding longitudinally therealong. Heat flow from the barbecue is adjusted by adjusting an angle between the hood top and cooking base, and then positioning the main body upon the cooking base in a position where it will maintain said angle. The clamping assembly is then used to fix the position of the main body on the cooking base rim.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
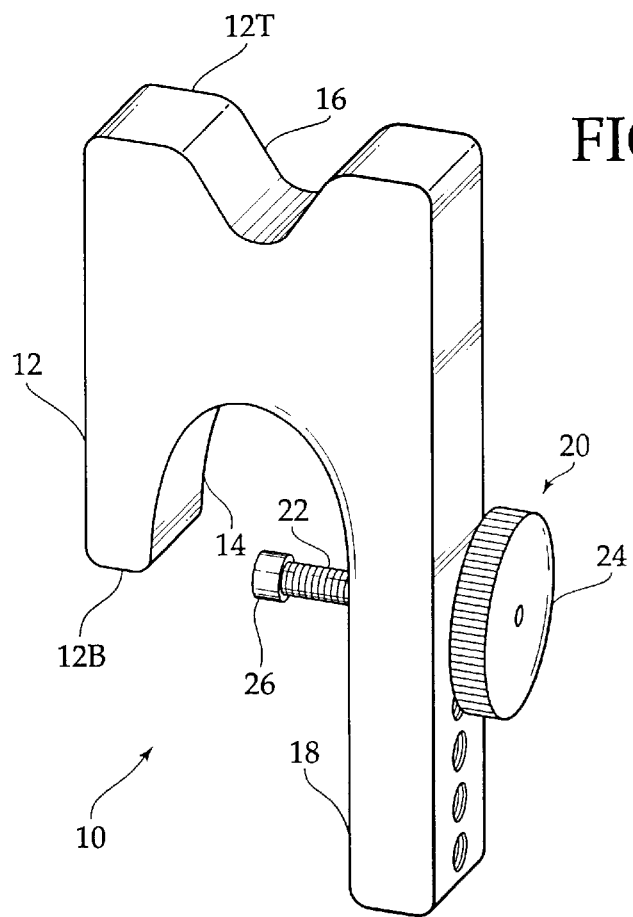
FIG. 1 is a diagrammatic perspective view, illustrating the invention per se.

FIG. 1 illustrates a heat control device 10, comprising a main body 12 having a main body top 12T and a main body bottom 12B, which includes a rim hollow 14, a hood hollow 16. The hood hollow 16 is located at the main body top 12T and is an indenture thereat. The rim hollow 14 is located at the main body bottom 12B, and comprises an arch extending upward therefrom.

A lower extension 18 extends downward from the main body bottom 12B. A clamping assembly 20 is attached at the lower extension 18. The clamping assembly 20 includes a threaded rod 22, an adjustment knob 24 fixed to the threaded rod 22 on one side, and a cap 26 fixed to the threaded rod 22 on the opposite side thereof.

Figure 2:
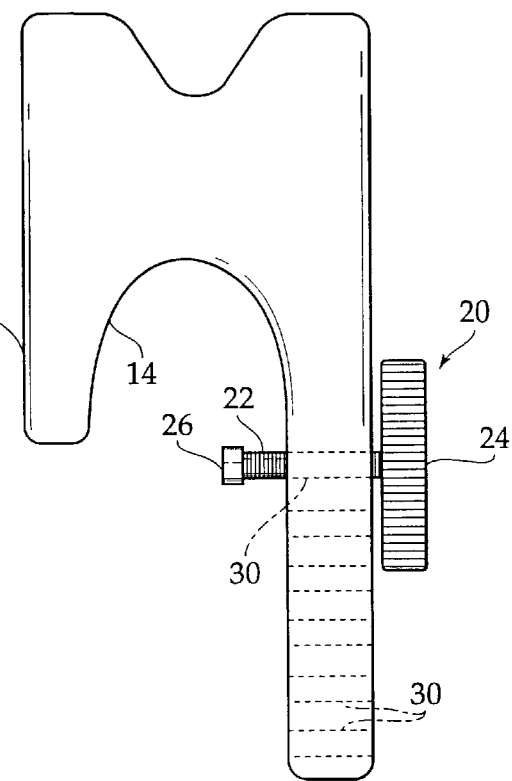
FIG. 2 is a front elevational view, depicting bores extending through the invention at varying heights, for adjusting the mounting height thereof.

Referring to FIG. 2, the main body 12 has at least one internally threaded bore 30 extending therethrough. The clamping assembly 20 is attached at the bore, wherein the threaded rod 22 extends fully through the bore 30, and the cap 26 and adjustment knob 24 are located at opposite sides of the bore 30. The cap 26 is located directly below the rim hollow 14.

As illustrated in FIG. 2, several bores 30 may be vertically spaced along the lower extension 18 so that the clamping assembly 20 may be mounted at different heights on the heat control device 10.

Figure 3:
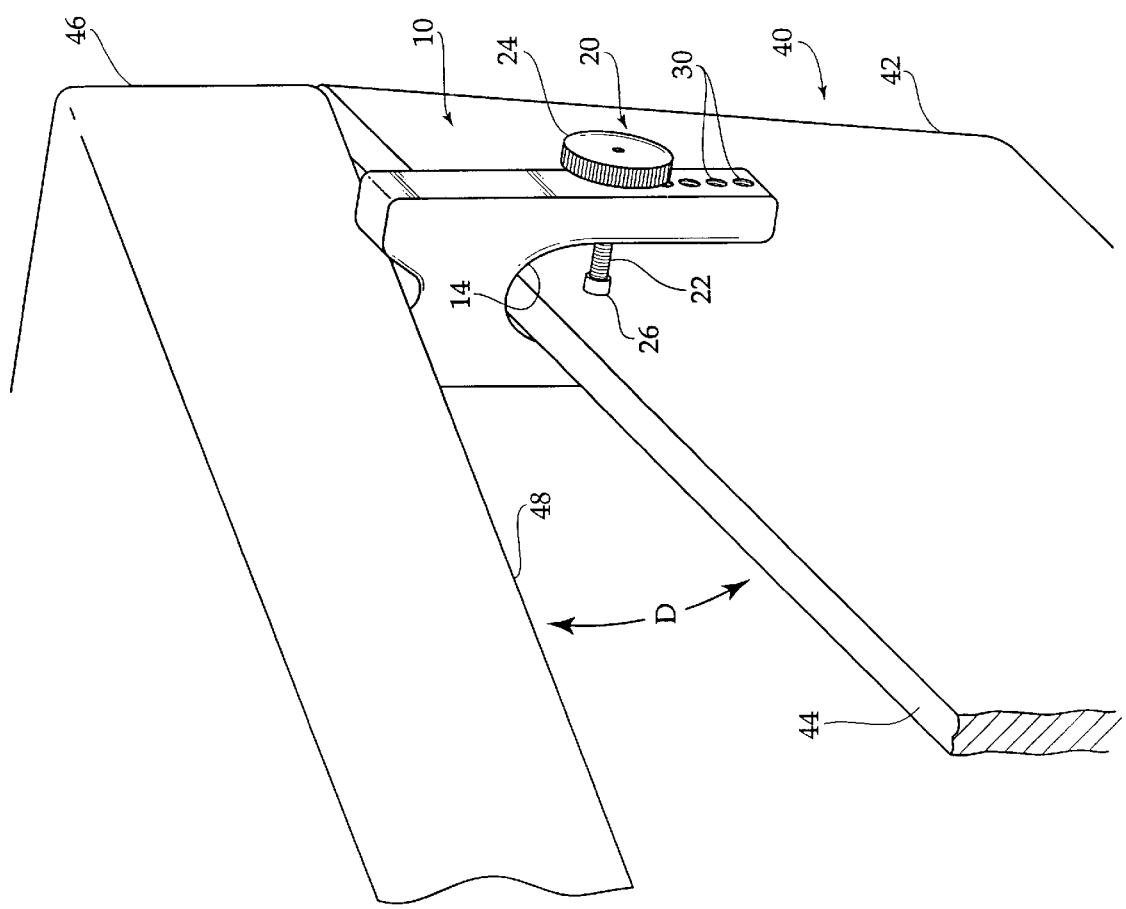
FIG. 3 is a diagrammatic perspective view, illustrating the invention in use, mounted on the rim of a barbecue cooking base, and propping the hood top in a partially open position.

Referring now to FIG. 3, a barbecue 40 is illustrated, comprising a cooking base 42, including a cooking base rim 44. The barbecue 40 also comprises a hood top 46, comprising a hood top rim 48. The hood top 46 is hingeably attached to the cooking base 42, such that the hood top rim 48 and cooking bas rim 44 can be selectively brought into contact, or can form an angle D therebetween.

While cooking, it is apparent that when the hood top rim 48 is in contact with the cooking base rim 44, i.e. the hood top 46 is in a closed position, then the barbecue 40 will maintain a maximum amount of heat within. It is also apparent that when the hood top rim 48 forms an angle with the cooking base rim 44, i.e. the hood top 46 in an open position, then heat will escape from the barbecue 40, lowering the temperature therein. Therefore, as the angle D is increased, the amount of heat escaping from the barbecue 40 will increase.

It is a primary function of the invention to vary the amount of heat escaping from the barbecue by fixing the angle D between the hood top 46 and cooking base 42 at any suitable angle, as determined by empirical study. Accordingly, the heat control device 10 extends over the cooking base rim 44 with the cooking base rim in the rim hollow 14, and engages the hood top 46, with the hood top rim 48 extending in the hood hollow 16.

The heat control device 10 is fixed into position by the clamping assembly 20, whereby the cap 26 is tightened against the cooking base 42 by advancing the threaded rod by turning the adjustment knob. Since the cap is located directly below the rim hollow 14, the cap 26 serves to tightly engage the cooking base 42 below the cooking base rim 44 without marring the surface thereof. The adjustment knob 24 allows hand tightening to be accomplished, and further insulates the user from heat from the barbecue 40.

When it is desired to adjust the heat flow from the barbecue 40, the adjustment knob is used to loosen the cap 26 against the cooking base 42. The heat control device 10 then may be slid longitudinally along the cooking base 42 to allow the hook top 46 to open and close, and vary angle D. When a suitable angle for the hood top 46, and thus a suitable location for the heat control device 10 is achieved, the adjustment knob 24 is used to advance the threaded rod 22 and tighten the cap 26 against the cooking base rim 44, to fix the position of the heat control device along the cooking base rim 44.

Also illustrated in FIG. 3, the plurality of internally threaded bores 30 allow the clamping assembly to be repositioned to accommodate barbecues having different configurations.

In conclusion, herein is presented a heat control device which selectively attaches onto a barbecue, and is selectively positionable along the cooking base rim of the barbecue to hold the hood top is a position where the barbecue maintains a desired level of heat.

What is claimed is:

1. A heat control device, for use with a barbecue having a cooking base having a cooking base rim and a hood top having a hood top rim, the hood top hingeably attached to the cooking base, comprising:

a main body having a main body top and a main body bottom, the main body bottom having a rim hollow for engaging the cooking base rim wherein the main body is capable of sliding along the cooking base rim, the main body top having a hood hollow for supporting the hood top rim and thereby forming an angle between the hood top and cooking base;

a clamping mechanism attached near the main body bottom for engaging the cooking base and positionally fixing the main body along the cooking base rim for fixing the angle between the hood top and cooking base, said clamping mechanism comprising a threaded rod, a cap attached onto one side of the threaded rod and located directly below the rim hollow for engaging the cooking base, and a knob attached to another side of the threaded rod for advancing the threaded rod to tighten the cap against the cooking base; and a lower extension which extends downward from the main body bottom, the lower extension having several internally threaded bores extending therethrough, vertically spaced along the lower extension, for allowing the clamping assembly to be mounted in the lower extension at different heights by extending the threaded rod of said clamping assembly through different bores.

2. A heat control method, for controlling the heat of a barbecue having a cooking base having a cooking base rim, and a hood top having a hood top rim, the hood top hingeably attached to the cooking base, using a heat control device having a main body, including a hood hollow and a rim hollow, and a clamping assembly, comprising the steps of:

adjusting heat flow from the barbecue by forming an angle between the cooking base rim and the hood top rim;

fixing the angle by placing the heat control device upon the cooking base rim with the cooking base rim extending in the rim hollow and with the hood top rim supported in the hood hollow, the main body being clamped against the cooking base using the clamping assembly.

3. The heat control method as recited in claim 2, wherein the main body has a lower extension having an internally threaded bore, wherein the clamping assembly includes a threaded rod which extends through the internally threaded bore of the main body, a cap located at one end of said threaded rod immediately below the rim hollow, and an adjustment knob located at another end of said threaded rod, and wherein the step of clamping the main body against the cooking base further comprises:

engaging the cooking base with the cap;

tightening the cap against the cooking base by advancing the threaded rod by turning the adjustment knob.

4. The heat control method as recited in claim 3, wherein the step of adjusting the heat flow further comprises sliding the heat control device longitudinally along the cooking base rim while the cooking base rim extends in the rim hollow.

* * * * *